US010794214B2

United States Patent
Suciu et al.

(10) Patent No.: US 10,794,214 B2
(45) Date of Patent: Oct. 6, 2020

(54) TIP CLEARANCE CONTROL FOR GAS TURBINE ENGINE

(71) Applicant: UNITED TECHNOLOGIES CORPORATION, Farmington, CT (US)

(72) Inventors: Gabriel L. Suciu, Glastonbury, CT (US); Mark F. Zelesky, Bolton, CT (US); Ioannis Alvanos, West Springfield, MA (US); Brian Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 770 days.

(21) Appl. No.: 15/589,009

(22) Filed: May 8, 2017

(65) Prior Publication Data

US 2018/0320542 A1 Nov. 8, 2018

(51) Int. Cl.
*F01D 11/24* (2006.01)
*F01D 25/24* (2006.01)

(52) U.S. Cl.
CPC ............ *F01D 11/24* (2013.01); *F01D 25/246* (2013.01); *F05D 2240/11* (2013.01);
(Continued)

(58) Field of Classification Search
CPC .......... F01D 11/14; F01D 11/16; F01D 11/18; F01D 11/20; F01D 11/24
See application file for complete search history.

(56) References Cited

U.S. PATENT DOCUMENTS 3,975,901 A * 8/1976 Hallinger ................ F01D 11/16
60/786
4,050,843 A * 9/1977 Needham ................ F01D 11/18
415/116

(Continued)

FOREIGN PATENT DOCUMENTS

| CA | 1156844 A | 11/1983 |
|---|---|---|
| GB | 2316134 | 2/1998 |

OTHER PUBLICATIONS

European Search Report for European Application No. 18170933.8 dated Nov. 22, 2018.

*Primary Examiner* — Igor Kershteyn
*Assistant Examiner* — Brian O Peters
(74) *Attorney, Agent, or Firm* — Carlson, Gaskey & Olds, P.C.

(57) ABSTRACT

A clearance control system for a gas turbine engine comprises at least one case support associated with an engine case defining an engine center axis. A clearance control ring is positioned adjacent the at least one case support to form an internal cavity between the engine case and the clearance control ring. The clearance control ring includes a first mount feature. An outer air seal has a second mount feature cooperating with the first mount feature such that the clearance control ring can move independently of the engine case in response to changes in temperature. An injection source inject flow into the internal cavity to control a temperature of the clearance control ring to allow the outer air seal to move in a desired direction to maintain a desired clearance between the outer air seal and an engine component. A gas turbine engine and a method of controlling tip clearance in a gas turbine engine are also disclosed.

18 Claims, 3 Drawing Sheets

(52) U.S. Cl.
CPC .... *F05D 2240/55* (2013.01); *F05D 2260/205* (2013.01); *F05D 2270/3062* (2013.01)

(56) References Cited

U.S. PATENT DOCUMENTS

| | | | | |
|---|---|---|---|---|
| 4,230,436 | A | * | 10/1980 | Davison .................. F01D 11/24 |
| | | | | 415/1 |
| 4,317,646 | A | | 3/1982 | Steel et al. |
| 4,596,116 | A | | 6/1986 | Mandet et al. |
| 4,928,240 | A | * | 5/1990 | Davison .................. F01D 11/24 |
| | | | | 415/116 |
| 5,116,199 | A | | 5/1992 | Ciokajlo |
| 6,401,460 | B1 | * | 6/2002 | Xia .......................... F01D 11/24 |
| | | | | 415/14 |
| 8,616,827 | B2 | * | 12/2013 | O'Leary ................. F01D 11/24 |
| | | | | 415/1 |
| 10,370,999 | B2 | * | 8/2019 | Blaney .................... F01D 11/20 |
| 2009/0208321 | A1 | * | 8/2009 | O'Leary ................. F01D 11/24 |
| | | | | 415/14 |
| 2015/0003958 | A1 | | 1/2015 | Uskert et al. |
| 2016/0053624 | A1 | | 2/2016 | McCaffrey et al. |
| 2016/0237842 | A1 | | 8/2016 | Blaney et al. |
| 2016/0326878 | A1 | * | 11/2016 | Morimoto ............... F01D 5/081 |
| 2016/0326915 | A1 | * | 11/2016 | Baladi .................... F01D 11/24 |

\* cited by examiner

FIG.5

TIP CLEARANCE CONTROL FOR GAS TURBINE ENGINE

BACKGROUND OF THE INVENTION

Gas turbine engines typically include a fan delivering air into a compressor. The air is compressed in the compressor and delivered into a combustion section where it is mixed with fuel and ignited. Products of this combustion pass downstream over turbine blades, driving them to rotate. Turbine rotors, in turn, drive the compressor and fan rotors. The efficiency of the engine is impacted by ensuring that the products of combustion pass in as high a percentage as possible across the turbine blades. Leakage around the blades reduces efficiency. Thus, a blade outer air seal (BOAS) is provided radially outward of the blades to prevent leakage.

The BOAS is spaced from a radially outer part of the blade by a tip clearance. The BOAS is traditionally associated with a carrier element that is mounted to a case structure. Since the blades, the BOAS, and the structure that support the BOAS are different sizes and/or are formed of different materials, they respond to temperature changes in different manners. As these structures expand at different rates in response to temperature changes, the tip clearance may be reduced and the blade may rub on the BOAS, or the tip clearance may increase reducing efficiency, both of which are undesirable.

Clearance control systems are used to control the tip clearance under different operational conditions. Traditional clearance control systems utilize valves and manifolds to direct fan air to specific engine case locations. The cooling air thermally shrinks the engine case at these locations to improve tip clearance and thus fuel burn. However, these manifolds and valves are large, heavy, and expensive. These systems can also be slow to respond and provide limited clearance improvement. By further reducing tip clearances increasing engine efficiency demands can be met.

SUMMARY OF THE INVENTION

In a featured embodiment, a clearance control system for a gas turbine engine comprises at least one case support associated with an engine case defining an engine center axis. A clearance control ring is positioned adjacent the at least one case support to form an internal cavity between the engine case and the clearance control ring. The clearance control ring includes a first mount feature. An outer air seal has a second mount feature cooperating with the first mount feature such that the clearance control ring can move independently of the engine case in response to changes in temperature. An injection source inject flow into the internal cavity to control a temperature of the clearance control ring to allow the outer air seal to move in a desired direction to maintain a desired clearance between the outer air seal and an engine component.

In another embodiment according to the previous embodiment, the outer air seal includes a seal support portion fit to the engine case adjacent to the at least one case support, and wherein the clearance control ring is not directly tied to the engine case or the seal support portion.

In another embodiment according to any of the previous embodiments, at least one case support includes a first radial wall portion extending inwardly from the engine case and a second radial wall portion axially spaced from the first radial portion to define the internal cavity, and wherein the clearance control ring is radially moveable relative to the first and second radial wall portions in response to changes in temperature.

In another embodiment according to any of the previous embodiments, the seal support portion includes a radial outward portion that is fit within a groove formed in the engine case adjacent each of the first and second radial wall portions.

In another embodiment according to any of the previous embodiments, one of the first and second mount features comprises a slot and another of the first and second mount features comprises an extension that is received within the slot to couple the outer air seal and clearance control ring together.

In another embodiment according to any of the previous embodiments, the slot and the extension comprise a key-shape each having a first portion extending in a radial direction and a second portion extending in an axial direction.

In another embodiment according to any of the previous embodiments, the clearance control ring includes at least one hole to direct flow from the internal cavity into an area between the outer air seal and the clearance control ring.

In another embodiment according to any of the previous embodiments, the injection source comprises a conduit that receives flow from a compressor section of the gas turbine engine.

In another embodiment according to any of the previous embodiments, a control is configured to deliver compressor flow at least at a first temperature into the internal cavity and against the clearance control ring to allow the outer air seal to move in a first direction to maintain a desired clearance for a first operating condition, and wherein the control is configured to deliver flow at least at a second temperature into the internal cavity and against the outer air seal to allow the outer air seal to move in a second direction to maintain a desired clearance for a second operating condition, and wherein the second temperature is less than the first temperature.

In another embodiment according to any of the previous embodiments, the engine component comprises at least one blade rotatable about an engine axis, the outer air seal being spaced radially outwardly from a tip of the blade by the clearance.

In another embodiment according to any of the previous embodiments, the outer air seal includes a seal support portion fit to the engine case adjacent to the at least one case support, a ring mount portion that includes the second mount feature, and a main seal portion that extends from the ring mount portion to face the engine component.

In another featured embodiment, a gas turbine engine comprises a compressor section, a combustor section downstream of the compressor section, and a turbine section downstream of the combustor section. The turbine section includes a plurality of blades rotatable about an engine axis and a blade outer air seal that is spaced radially outwardly from a tip of the blades by a clearance. A clearance control system includes at least one support associated with a turbine case. A clearance control ring is positioned adjacent the at least one support to form an internal cavity between the clearance control ring and the turbine case. The clearance control ring includes a first mount feature. The blade outer air seal has a second mount feature cooperating with the first mount feature such that the clearance control ring can move independently of the at least one support and the turbine case in response to changes in temperature. An injection source injects flow into the internal cavity to control a temperature of the clearance control ring to allow the blade outer air seal to move in a desired direction to maintain a desired clearance between the blade outer air seal and an engine component.

In another embodiment according to the previous embodiment, the blade outer air seal comprises a segmented ring. The clearance control ring comprises a full hoop ring.

In another embodiment according to any of the previous embodiments, at least one support includes a first radial wall portion and a second radial wall portion axially spaced from the first radial wall portion to define the internal cavity, and wherein the clearance control ring is radially moveable relative to the first and second radial wall portions in response to changes in temperature.

In another embodiment according to any of the previous embodiments, one of the first and second mount features comprises a slot and another of the first and second mount features comprises an extension that is received within the slot to couple the outer air seal and clearance control ring together.

In another embodiment according to any of the previous embodiments, the injection source comprises a conduit that receives flow from the compressor section.

In another embodiment according to any of the previous embodiments, a control is configured to deliver compressor flow at least at a first temperature into the internal cavity and against the clearance control ring to allow the outer air seal to move in a first direction to maintain the desired clearance for a first operating condition. The control is configured to deliver flow at least at a second temperature into the internal cavity and against the outer air seal to allow the outer air seal to move in a second direction to maintain the desired clearance for a second operating condition. The second temperature is less than the first temperature.

In another embodiment according to any of the previous embodiments, the blade outer air seal includes a seal support portion fit to the turbine case adjacent to the at least one support, a ring mount portion that includes the second mount feature, and a main seal portion that extends from the ring mount portion to face the tip of the blade.

In another featured embodiment, a method of controlling tip clearance in a gas turbine engine includes providing at least one support associated with an engine case defining an engine center axis, and a clearance control ring positioned adjacent the at least one support to form an internal cavity between the clearance control ring and the engine case, the clearance control ring including a first mount feature. An outer air seal is spaced radially outwardly from a tip of the blade by a clearance, the outer air seal having a second mount feature cooperating with the first mount feature such that the clearance control ring can move independently of the at least one support and engine case in response to changes in temperature. Flow is injected into the internal cavity to control a temperature of the clearance control ring to allow the outer air seal to move in a desired direction to maintain a desired clearance between the outer air seal and the tip of the blade.

In another embodiment according to the previous embodiment, delivering flow is delivered at least at a first temperature into the internal cavity and against the clearance control ring to allow the outer air seal to move in a first direction to maintain the desired clearance for a first operating condition, and delivering flow at least at a second temperature into the internal cavity and against the outer air seal to allow the outer air seal to move in a second direction to maintain the desired clearance for a second operating condition, and wherein the second temperature is less than the first temperature and including providing a floating mount for the clearance control ring such that the clearance control ring is not directly tied to the engine case or the at least one support, and is able to move radially inwardly and outwardly in response to changes in temperature.

The foregoing features and elements may be combined in any combination without exclusivity, unless expressly indicated otherwise.

These and other features may be best understood from the following drawings and specification.

DETAILED DESCRIPTION

Figure 1:
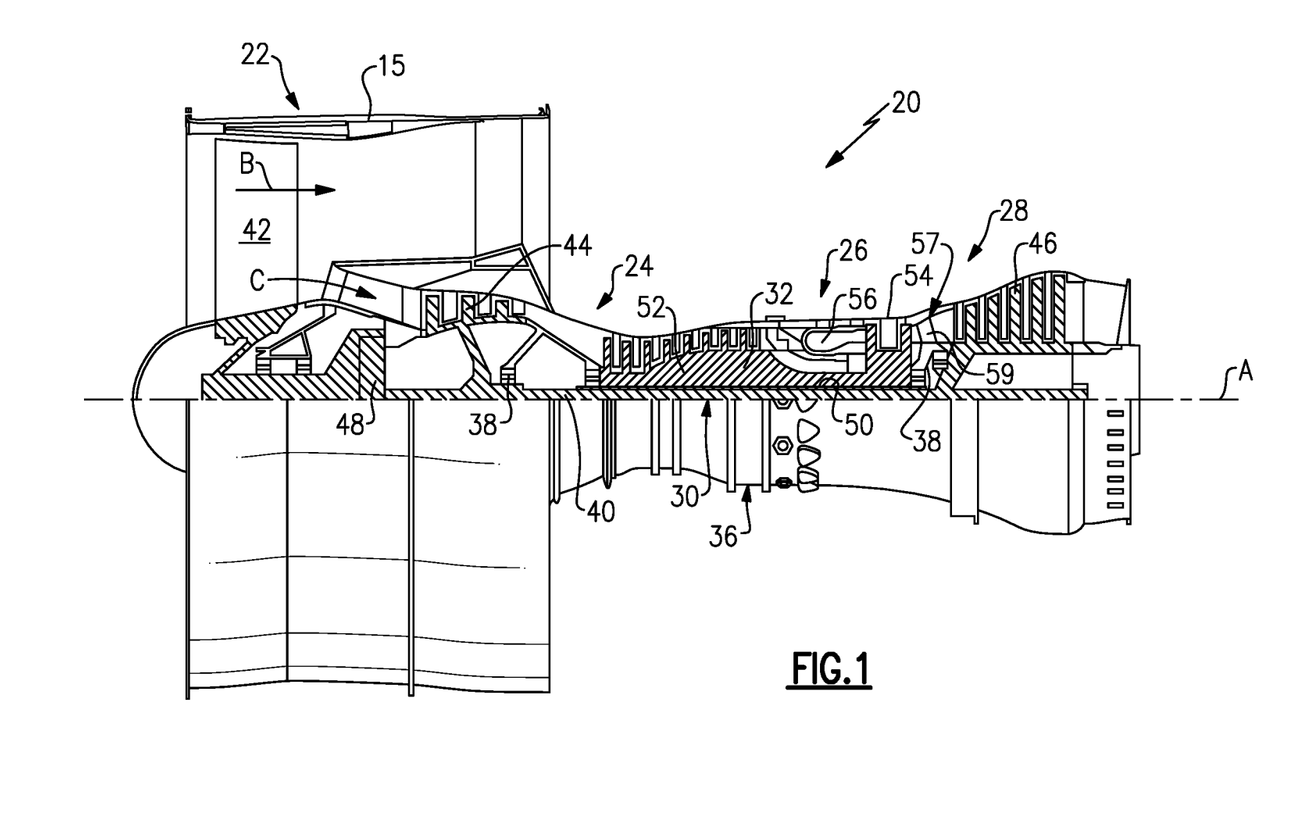
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°R)]^{0.5}$. The "Low corrected fan tip speed" as disclosed herein according to one non-limiting embodiment is less than about 1150 ft/second.

Figure 2A:
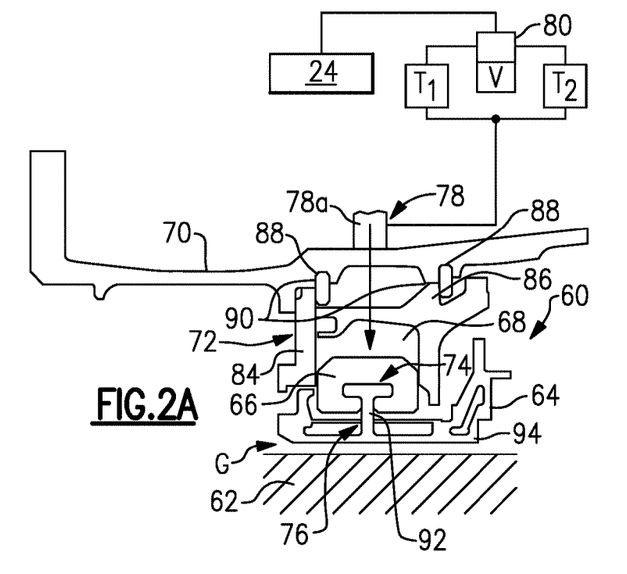
FIG. 2A is a section view of a full hoop clearance control ring and a BOAS assembly positioned between a blade and a case structure.
Figure 2B:
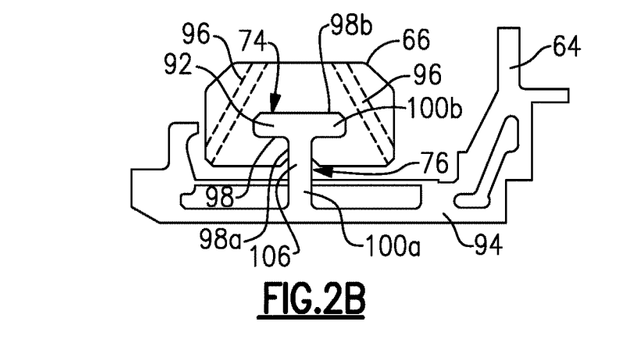
FIG. 2B is a magnified view of the ring and a portion of the BOAS of FIG. 2A.

FIGS. 2A-2B show an outer air seal assembly 60 spaced by a clearance gap G from a radially outer tip of a rotating blade 62. In one example, the blade 62 is a component of the turbine section 28 as shown in FIG. 1. However, the outer air seal assembly 60 may be used in other engine configurations and/or locations, for example in the compressor sections. The outer air seal assembly 60 includes an outer air seal body 64 that is mounted to a clearance control ring 66. An internal cavity 68 is formed between a case structure 70 and the outer air seal assembly 60. A support structure 72 is associated with the case structure 70 to provide support for the outer air seal assembly 60.

In an active clearance control system, air impinges on the turbine case when activated to cool and shrink the case diameter. This in turn reduces the diameter of the segmented blade outer air seal assembly. The seal body in this application is in segments to prevent thermal fighting between the seal and the turbine case to which the seal ultimately mounts to and which is a full hoop. The turbine case that comprises the full hoop structure is what controls the position of the blade outer air seal. Due to the mass of the turbine case and the thermal environment within which the turbine case operates, the turbine case is slow to respond thermally as the engine power level is increased. The turbine rotor diameter, however, will increase rapidly as the rotational speed and temperature of the engine increases. For this reason, extra clearance must be added between the tip of the blade and the blade outer air seal assembly to prevent rubbing contact between these two structures. However, this extra clearance can adversely affect engine performance.

The subject invention provides a configuration where the clearance control ring 66 is positioned adjacent the support structure 72 but is not directly tied to the case structure 70 or support structure 72. In one example configuration, the clearance control ring 66 includes a first mount feature 74 and the seal body 64 includes a second mount feature 76 that cooperates with the first mount feature 74 such that the clearance control ring 66 can move within the internal cavity 68 independently of the support structure 72 and case structure 70 in response to changes in temperature. In one example, the clearance control ring 66 is a full hoop ring made from a material with a high thermal expansion coefficient, for example. This new configuration with the clearance control ring 66 reacts much faster than prior active control systems due to the reduced thermal mass and due to being exposed to air from the engine gaspath in contrast to prior systems where the heavy turbine case was exposed to the engine core compartment temperatures.

An injection source 78 injects or delivers cooling fluid flow, for example, air flow, into the internal cavity 68 to control a temperature of the clearance control ring 66 to allow the outer air seal body 64 to move in a desired direction to maintain a desired clearance between the outer air seal body 64 and a tip of the blade 62, i.e. to control the size of the clearance gap G. In one example, the injection source 78 comprises a tube or conduit 78a that receives air flow from the compressor section 24 (FIG. 1) of the gas turbine engine. As shown in FIG. 2A, a control 80 is configured to deliver the compressor air at a first temperature T1 into the internal cavity 68 and against the clearance control ring 66 to allow the outer air seal body 64 to move in a first direction to maintain a desired clearance during a first operating condition, and is configured to deliver compressor air at a second temperature T2 into the internal cavity 68 and against the outer air seal body 64 to allow the outer air seal body 64 to move in a second direction to maintain a desired clearance during a second operating condition. In one example, the first operating condition comprises a take-off or high load event, and the second operating condition comprises a descending event.

In these example operating conditions, the second temperature T2 is less than the first temperature T1. In this example, the compressor air at the second temperature T2 can comprise cooled cooling air from the compressor exit while the air at the first temperature can comprise uncooled compressor exit air. The control 80 comprises a microprocessor and/or control unit that is programmed to deliver air flow at the first T1 or second T2 temperature as needed dependent upon the engine operating condition. The control C can further include valves V, flow conduits, and/or heat exchangers as needed to deliver the compressor air at the desired temperature. The control 80 delivers higher temperature air T1 into the cavity 68 when the clearance control ring 66 is to increase in diameter and delivers lower temperature air T2 into the cavity 68 when the clearance control ring 66 is to decrease in diameter. It should be understood that while two different temperatures are discussed as examples, the system is infinitely variable and the system can deliver fluid at any desired temperature.

Figure 3:
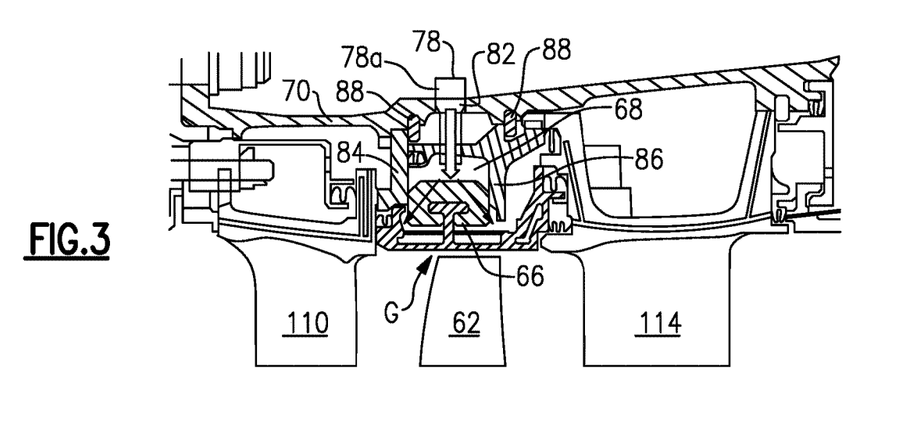
FIG. 3 is a view similar to FIG. 2A but showing the assembly in a turbine section.

The case structure 70 includes an opening 82 (FIG. 3) to receive the conduit 78a which directs compressor air into the cavity 68. The support structure 72 includes a first radial wall portion 84 extending radially inward from the case structure 70 and a second radial wall portion 86 axially spaced from the first radial portion 84 to define the internal cavity 68. The opening 82 is positioned axially between the first 84 and second 86 radial portions. The case structure 70 includes trenches or grooves 88 adjacent to each of the first 84 and second 86 radial wall portions.

The seal body 64 includes a seal support portion 90 and a ring mount portion 92. The grooves 88 receive the seal support portion 90 to seat the outer air seal assembly 60 relative to the case structure 70. These comprise tight radial fits to the case structure 70 at the grooves 88. The clearance control ring 66 is radially moveable relative to the first 84 and second 86 radial wall portions in response to temperature changes via the connection interface to the ring mount portion 92. A main seal portion 94 extends from the ring mount portion 92 to face the blade 62.

The first 74 and second 76 mount portions are shown in greater detail in FIG. 2B. One of the first 74 and second 76 mount features comprises a slot 98 and another of the first 74 and second 76 mount features comprises an extension 100 that is received within the slot 98 to couple the outer air seal body 64 and clearance control ring 66 together. In the example shown, the clearance control ring 66 includes the slot 98 and the seal body 64 includes the extension 100; however, the reverse configuration could also be used. In one example, the slot 98 and the extension 100 comprise a key-shape, with each of the slot 98 and extension 100 having a first portion 98a, 100a extending in a radial direction and a second portion 98b, 100b extending in an axial direction. This type of configuration provides a floating connection interface that fully supports and properly locates the seal 64 while still controlling the seal 64 to move radially inwardly and outwardly as needed.

Figure 4A:
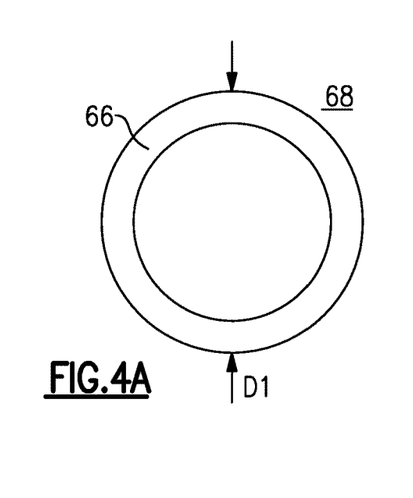
FIG. 4A is a schematic side view of the ring at a first temperature.
Figure 4B:
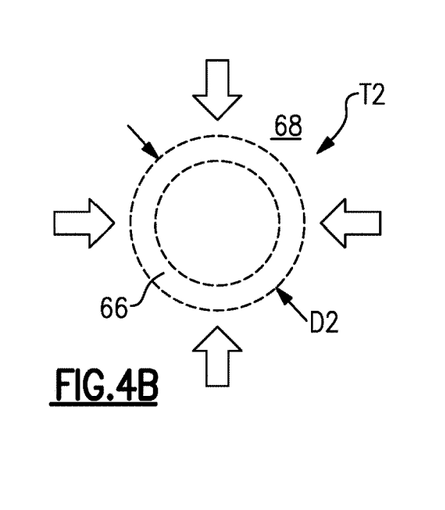
FIG. 4B is a schematic view similar to FIG. 4A but at a decreased temperature relative to the first temperature.
Figure 4C:
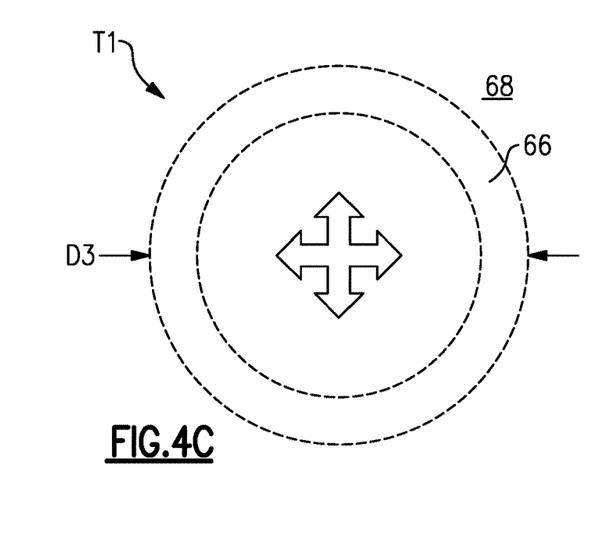
FIG. 4C is a schematic view similar to FIG. 4A but at an increased temperature relative to the first temperature.

As shown in FIGS. 4A-4B, when the clearance control ring 66 is in a first temperature, the ring has a first diameter D1. When the control 80 delivers lower temperature air T2 (FIG. 4B) to the cavity 68, the clearance control ring 66 contracts to a second diameter D2 that is less than the first diameter D1. This allows the seal body 64 to move radially inwardly toward the blade 62. When the control 80 delivers higher temperature air T1 (FIG. 4C) to the cavity 68, the clearance control ring 66 expands to a third diameter D3 that is greater than the first diameter D1. This allows the seal body 64 to move radially outwardly away from the blade 62.

Thermal growth rate $T_G$ is calculated as $T_G = R\alpha\Delta T$ where R is the radius of the ring, $\Delta T$ is the difference between the initial and final temperatures, and $\alpha$ is a thermal coefficient of expansion determined based on the material of the ring.

In one example, the control ring 66 optionally includes one or more through holes 96 (see dashed lines in FIG. 2B that direct air through the body of the control ring 66.

Figure 5:
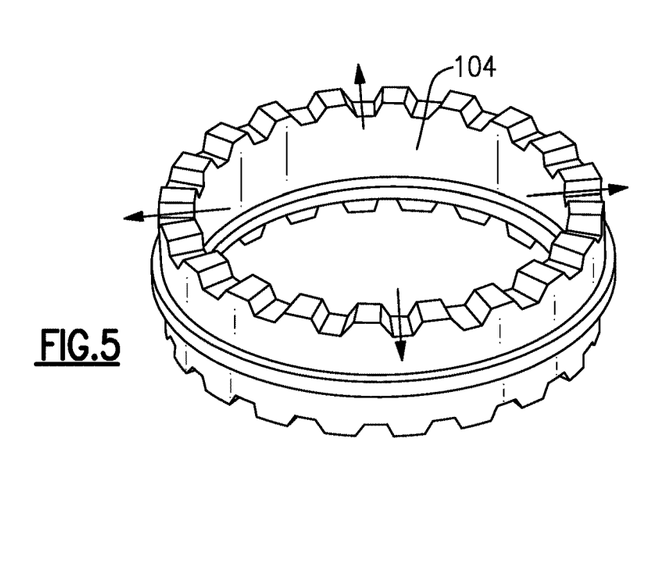
FIG. 5 shows an example of a radial spline.

In one example, the outer air seal body 64 comprises a segmented ring and the clearance control ring 66 comprises a full hoop ring. The segmented ring includes a plurality of body segments that are circumferentially arranged to form the annular outer air seal assembly 60 as known. In one example, the full hoop ring comprises a radial spline 104 similar to that shown in FIG. 5. In the subject clearance control system, the radial spline may include additional splines or a reduced number of splines than that which is shown in FIG. 5.

The subject invention provides a high pressure turbine internal ring comprising a clearance control ring 66 connected to an outer air seal body 64, where the control ring 66 is made from a material with a high thermal expansion coefficient. The control ring 66 is configured to be mounted to the air seal body 64 in an isolated manner such that the connecting mass is much lower than that of a turbine case structure 70. The control ring 66 is free floating on a radial spline such that the control ring's movement is not restricted. When the system is activated, cooled cooling air from the compressor, which is approximately 50-400 degrees Fahrenheit cooler than the air surrounding the control ring, is pumped into the internal cavity 68 and channeled around or through the control ring 66 to rapidly reduce the ring temperature and diameter as needed. In the same manner, during specified operating conditions, the control directs uncooled compressor exit air to rapidly increase the temperature of the control ring and diameter as needed.

The rapid response of the system allows for overall tighter high pressure turbine clearances to be set which yields an improved thrust specific fuel consumption (TSFC). In one simulated example, the TSFC increases as much as 0.4% with the use of the subject control ring 66. The subject system is also lighter and less expensive than traditional systems, which use large pipes, valves, and complex manifolds. The subject system uses small diameter plumbing and valves without the complex manifold. The subject system also allows both heated and cooled air to be channeled through the control ring 66 to increase and decrease the diameter of the ring as needed.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A clearance control system for a gas turbine engine comprising:
   at least one case support associated with an engine case defining an engine center axis;
   a clearance control ring positioned adjacent the at least one case support to form an internal cavity between the engine case and the clearance control ring, and wherein the clearance control ring includes a first mount feature;
   an outer air seal having a second mount feature cooperating with the first mount feature such that the clearance control ring can move independently of the engine case in response to changes in temperature, wherein the outer air seal includes a seal support portion separate from the second mount feature and fir to the engine case adjacent to the at least one case support, a ring mount portion that includes the second mount feature, and a main seal portion that extends from the ring mount portion to face the engine component, and wherein the clearance control ring is not directly tied to the engine case or the seal support portion; and an injection source to inject flow into the internal cavity to control a temperature of the clearance control ring to allow the outer air seal to move in a desired direction to maintain a desired clearance between the outer air seal and an engine component.

2. The system according to claim 1 wherein the at least one case support includes a first radial wall portion extending inwardly from the engine case and a second radial wall portion axially spaced from the first radial portion to define the internal cavity, and wherein the clearance control ring is radially moveable relative to the first and second radial wall portions in response to changes in temperature.

3. The system according to claim 2 wherein the seal support portion includes
a first radial outward portion that is fit within a first groove formed in the engine case adjacent one of the first and second radial wall portions, and
a second radial outward portion axially spaced from the first radial outward portion and that is fit within a second groove formed in the engine case adjacent the other of the first and second radial wall portions.

4. The system according to claim 1 wherein the clearance control ring has a radially outer surface and a radially inner surface that extend in axial direction between a first end and a second end, and wherein the outer air seal has a radially outer surface and a radially inner surface that extend in axial direction between a first end and a second end, and wherein one of the first and second mount features comprises a slot and another of the first and second mount features comprises an extension that is received within the slot to couple the outer air seal and clearance control ring together, and wherein the slot and the extension are spaced axially apart from the first and second ends of the outer air seal and clearance control ring.

5. The system according to claim 4 wherein the slot and the extension comprise a key-shape each having a first portion extending in a radial direction and a second portion extending in opposing axial direction from opposing sides of the first portion.

6. The system according to claim 1 wherein the clearance control ring includes at least one hole to direct flow from the internal cavity into an area between the outer air seal and the clearance control ring.

7. The system according to claim 1 wherein the injection source comprises a conduit that receives flow from a compressor section of the gas turbine engine.

8. The system according to claim 7 including a control configured to deliver compressor flow at least at a first temperature into the internal cavity and against the clearance control ring to allow the outer air seal to move in a first direction to maintain a desired clearance for a first operating condition, and wherein the control is configured to deliver flow at least at a second temperature into the internal cavity and against the outer air seal to allow the outer air seal to move in a second direction to maintain a desired clearance for a second operating condition, and wherein the second temperature is less than the first temperature.

9. The system according to claim 1 wherein the engine component comprises at least one blade rotatable about an engine axis, the outer air seal being spaced radially outwardly from a tip of the blade by the clearance.

10. A gas turbine engine comprising:
a compressor section;
a combustor section downstream of the compressor section;
a turbine section downstream of the combustor section, wherein the turbine section includes a plurality of blades rotatable about an engine axis and a blade outer air seal that is spaced radially outwardly from a tip of the blades by a clearance; and
a clearance control system that includes
at least one support associated with a turbine case,
a clearance control ring positioned adjacent the at least one support to form an internal cavity between the clearance control ring and the turbine case, the clearance control ring including a first mount feature,
the blade outer air seal having a second mount feature cooperating with the first mount feature such that the clearance control ring can move independently of the at least one support and the turbine case in response to changes in temperature, wherein the blade outer air seal includes a seal support portion separate from the second mount feature and fit to the turbine case adjacent to the at least one support, a sing mount portion that includes the second mount feature, and a main seal portion that extends from the ring mount portion to face the tip of the blades, and wherein the clearance control ring is not directly tied to the turbine case or the seal support portion, and
an injection source to inject flow into the internal cavity to control a temperature of the clearance control ring to allow the blade outer air seal to move in a desired direction to maintain a desired clearance between the blade outer air seal and the tip of the blades.

11. The engine according to claim 10 wherein the blade outer air seal comprises a segmented ring, and wherein the clearance control ring comprises a full hoop ring.

12. The engine according to claim 10 wherein the at least one support includes a first radial wall portion and a second radial wall portion axially spaced from the first radial wall portion to define the internal cavity, and wherein the seal support portion includes
a first radial outward portion that is fit within a first groove formed in the turbine case adjacent one of the first and second radial wall portions, and
a second radial outward portion axially spaced from the first radial outward portion and that is fit within a second groove formed in turbine case adjacent the other of the first and second radial wall portions, and wherein the clearance control ring is not directly tied to the turbine case or the seal support portion such that the clearance control ring is radially moveable relative to the first and second radial wall portions in response to changes in temperature.

13. The engine according to claim 10 wherein the clearance control ring has a radially outer surface and a radially inner surface that extend in axial direction between a first end and a second end, and wherein the outer air seal has a radially outer surface and a radially inner surface that extend in axial direction between a first end and a second end, and wherein one of the first and second mount features comprises a slot and another of the first and second mount features comprises an extension that is received within the slot to couple the outer air seal and clearance control ring together, and wherein the slot and the extension are spaced axially apart from the first and second ends of the outer air seal and clearance control ring.

14. The engine according to claim 10 wherein the injection source comprises a conduit that receives flow from the compressor section.

15. The engine according to claim 14 including a control configured to deliver compressor flow at least at a first temperature into the internal cavity and against the clearance control ring to allow the outer air seal to move in a first direction to maintain the desired clearance for a first operating condition, and wherein the control is configured to deliver flow at least at a second temperature into the internal cavity and against the outer air seal to allow the outer air seal to move in a second direction to maintain the desired clearance for a second operating condition, and wherein the second temperature is less than the first temperature.

16. A method of controlling tip clearance in a gas turbine engine comprising:
providing at least one support associated with an engine case defining an engine center axis, and a clearance control ring positioned adjacent the at least one support to form an internal cavity between the clearance control ring and the engine case, the clearance control ring including a first mount feature;
providing an outer air seal that is spaced radially outwardly from a tip of a blade by a clearance, the outer air seal having a second mount feature cooperating with the first mount feature such that the clearance control ring can move independently of the at least one support and engine case in response to changes in temperature, wherein the outer air seal includes a seal support protein separate from the second mount feature and fit to the engine case adjacent to the at least one support, a ring mount portion that includes the second mount feature, and a main seal portion that extends from the ring mount portion to fac the tip of the blade, and wherein the clearance control ring is not directly tied to the engine case or the seal support portion; and
injecting flow into the internal cavity to control a temperature of the clearance control ring to allow the outer air seal to move in a desired direction to maintain a desired clearance between the outer air seal and the tip of the blade.

17. The method according to claim 16 including
delivering flow at least at a first temperature into the internal cavity and against the clearance control ring to allow the outer air seal to move in a first direction to maintain the desired clearance for a first operating condition, and delivering flow at least at a second temperature into the internal cavity and against the outer air seal to allow the outer air seal to move in a second direction to maintain the desired clearance for a second operating condition, and wherein the second temperature is less than the first temperature and including providing a floating mount for the clearance control ring such that the clearance control ring is not directly tied to the engine case or the at least one support, and is able to move radially inwardly and outwardly in response to changes in temperature.

18. The method according to claim 16 wherein the at least one support includes a first radial wall portion extending inwardly from the engine case and a second radial wall portion axially spaced from the first radial portion to define the internal cavity, and wherein the clearance control ring is radially moveable relative to the first and second radial wall portions in response to changes in temperature, and wherein the seal support portion includes
a first radial outward portion that is fit within a first groove formed in the engine case adjacent one of the first and second radial wall portions, and
a second radial outward portion axially spaced from the first radial outward portion and that is fit within a second groove formed in the engine case adjacent the other of the first and second radial wall portions.

* * * * *